(12) United States Patent
Shupak

(10) Patent No.: US 6,874,140 B1
(45) Date of Patent: Mar. 29, 2005

(54) DEBUG ANNOTATIONS

(75) Inventor: Richard M. Shupak, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 502 days.

(21) Appl. No.: 09/628,839

(22) Filed: Jul. 31, 2000

(51) Int. Cl.$^7$ ................................................ G06F 9/45
(52) U.S. Cl. ...................................... 717/131; 717/146
(58) Field of Search .................................. 717/114–161

(56) References Cited

U.S. PATENT DOCUMENTS

| | | | | |
|---|---|---|---|---|
| 5,815,714 A | * | 9/1998 | Shridhar et al. ............. | 717/129 |
| 5,815,720 A | * | 9/1998 | Buzbee ....................... | 717/158 |
| 5,822,588 A | * | 10/1998 | Sterling et al. ............. | 717/131 |
| 5,950,003 A | * | 9/1999 | Kaneshiro et al. .......... | 717/130 |
| 6,049,666 A | * | 4/2000 | Bennett et al. ............. | 717/130 |
| 6,572,661 B1 | * | 6/2003 | Stern ......................... | 715/501.1 |

OTHER PUBLICATIONS

Aho, Alfred V. "Compilers: Principles, Techniques, and Tools", 1986. pp. 83–85 and 463–508.*

"Compilers: Principles, Techniques, and Tools" by Alfred Aho, 1986. pp. 11, 60–62, 429–440.*

"Microsoft Press Computer Dictionary: Third Edition", 1997. p. 449.*

* cited by examiner

Primary Examiner—St. John Courtenay, III
(74) Attorney, Agent, or Firm—Merchant & Gould PC

(57) ABSTRACT

An annotation source representation is supported by a compiler and/or linker to annotate program code, so that analysis tools, such as debuggers and profilers, have more information with which to analyze an executable program. The annotation source representation in the source code is compiled into annotation information so that the annotation remains in the executable code, but is not executed. The annotation information in the executable program is associated with the code that the annotation function is associated with. The present invention eliminates the need of parallel/companion input command files, eliminates the need of compiling a special version of the executable program for purposes of analysis, and eliminates the need of implementing debug statements in the source code.

47 Claims, 6 Drawing Sheets

DEBUG ANNOTATIONS

FIELD OF THE INVENTION

This invention relates generally to computer program development tools, and more particularly to annotating computer program source code.

BACKGROUND OF THE INVENTION

Performance tools or other analysis tools, such as debuggers, instruction counters, profiles, fault-injectors, resource failure simulators, and optimizers often require or use additional information that describes the object code or executable code being analyzed. In general the purpose of analysis tools is to perform an analysis of the code and possibly produce something else such as the result of the analysis or new source or object code.

The additional information may be used to override default behavior for special cases or other exceptions. The additional information may also be used to instruct the tool to perform additional actions. This additional information augments the information that may be inherent in the object code file format and debug information that is or can be automatically generated by the computer, linker, and other tools involved in the process or generating the object code.

One conventional method of providing the additional information to tools is to pass the information on the command line when invoking the tool, in the environment of the computer, or in a command file that is processed by the tool either automatically or as specified by a analysis tool settings. Analysis tool settings include command line options, environment settings, or command files.

There are several problems with the conventional techniques. One problem is that the analysis tool settings exist independent from the source code from which the code is generated. When changes are made to the source code, changes may be necessary for the analysis tool settings too. The changes require a high degree of coordination since the people responsible for changes to the source may not be the same people that are responsible for changes to the analysis tool settings.

Another problem is that the references in the analysis tool settings to the code may depend on the target environment for which the object code is targeted. Examples of target environments are the microprocessor architectures of the Intel x86 or the Intel IA-64, or platforms, such as Microsoft Windows 2000 or Microsoft Windows CE. One example of this problematic dependency is wherein the names of C and C++ functions and data as identified in object code do not match the names used in the source code. To further complicate the situation, the names differ between architectures like the x86 and the Intel IA-64. The names can also embody different calling conventions for a single architecture like __cdecl, stdcall, and __fastcall, all of which are supported for the x86 processor by Microsoft's Visual C++. Supporting multiple target environments often requires multiple independent sets of analysis tool settings.

More specifically, where the source code is written in C++, factors beyond the calling convention may complicate the dependency of the analysis tool settings on the target environment. The names in object code generated from C++ are usually mangled names which are also known as decorated names. The purpose of the mangled names and/or decorated names is to include not only the name of the function or data being identified, but to also include its type (e.g. char foo is decorated differently than int foo). The type information that is included in the managed name and even the algorithm for generating the decorated name can vary between target environment also introducing instances where multiple sets of analysis tool settings are necessary.

Another problem related to mangled names is that different configurations of a single set of source code for a single target environment may have differences in the type of some item that results in different mangled names for the different configurations.

Yet another problem related to mangled names is that the names are meant to be meaningful to computer software but not to users. The mangled names sometimes are very cryptic. If users have to specify mangled names in their analysis tool settings the users are more likely to make errors than if the users are able to use the same names used in the source code.

Another problems is that names in the source code may not need to be unique. For example, C and C++ allow functions to be declared static. Distinction functions in different source code files may have the same name. The same is true of data. This is a further complication because it required the analysis tool to define a mechanism to qualify the name specified by the source code file or more likely object code file in which it resides. The name or path of the object code file may vary depending on the target environment introducing further complications. The name or path may also vary from machine to machine introducing yet another complication.

Still another problem occurs when a function is inlined at the position in the source code where the function is referenced, and the function loses its separate identify. When a function is inlined, the implementation of that function is expanded in the object at the point corresponding to a reference in the source. The object code for the inlined function no longer has an identity of its own. In many cases the author of the source code is not aware when inlining occurs. The lack of identity makes it difficult or impossible to refer to this inline instance in the analysis tool settings. That the compiler, linker, or other tools can perform inlining without the source code author's knowledge makes it possible that the author or analysis tool user may not be aware that an analysis tool setting is necessary.

Still yet another problem is related to C+ templates or similar source constructs. While the source code contains a single definition of the template item, the object code may contain many and the author of the source code may not be aware when the compiler instantiates template items or how these instances are identified in the compiler generated mangled names. There are more cases where it is difficult to identify the names in the analysis tool settings or the source code author or analysis tool user are unaware a setting is necessary. All of the problems described above can be avoided by taking the information that is provided in the analysis tool settings and annotating the source code. By having the annotations in the source the problems associated with having to know the names to specify in the analysis tool settings or having to maintain multiple sets of analysis tool settings for different target environments or build configurations is avoided.

Another convention solution is annotating source code from the information that is provided in the analysis tool settings.

There are several possible forms of source code annotations. One form is source code comments like /**/ or // in C and C++. This form of annotation is used in some source code analysis tools. By having comments of a special form the annotation is recognized by the analysis tool but treated as a comment by the compiler as intended in the language definition. There are a number of problems that make this unsuitable for annotating object code. One problem is that compilers are designed to ignore the comments, though a compiler could be designed to recognize some of these annotations on its own and handle them in some special way. Another problem is related to the capability of preprocessing C and C++ source and subsequently expanding #include file references and macro definitions. The resulting files usually have comments removed which results in the loss of all the source code annotations. Another problem is that annotations expressed in comments can't make use of the preprocessing facilities of languages like C and C++ which is important to allow annotations to vary according to target environment, build configuration, or any other factor desired by the source code author and/or analysis tool user.

Another form of annotation is compiler pragma like the #pragma directive in C and C++. This form of annotation has problems because it is source line oriented and can not appear at arbitrary locations in the source code. It too has limitations with regard to preprocessing. A #pragma directive can not appear within a C/C++ macro that can then be placed where desired in the source code.

Another form of annotation is to insert source code that gets translated into object in the generated object file. For example, C runtime printf calls may be added as a form of debugging aid or trace of program execution. A resulting problem is that for any particular configuration, the annotation code is present in the resulting executable. The executable code is often considerably larger because of this. There may also be overhead in execution time because of the additional object code. The overhead is avoided by having multiple build configurations that differ only in whether or not the annotations are present in the object code. At best this is additional overhead to the developer to maintain and produce two different configurations. At worst it defeats the purpose of the analysis tool for which the intent is to analyze the result of the build configuration without the additional code.

SUMMARY OF THE INVENTION

The above-mentioned shortcomings, disadvantages and problems are addressed by the present invention, which will be understood by reading and studying the following specification.

An intrinsic function is supported by a compiler to annotate the program code, so that analysis tools, such as debuggers and profilers, have more information with which to analyze performance or whatever is of interest. The annotation information in the executable program remains associated with the code that the annotation function is associated with. More specifically, an annotation function in the source code is parsed and the parsed function is transformed into an intermediate form, and annotation information is generated from the intermediate language code. Therefore, the annotation information corresponds to the annotation function. In another embodiment, a new type of syntax specific to annotations is created and a compiler is updated or modified to support the syntax.

Analysis tools are adapted to respond to the annotation information by changing the execution of the computer program analysis tool using the annotation, such as using the annotation to override the default behavior of the tool. This eliminates the need to create input command files for the analysis tools, and the consequent need to update the input command files in parallel to the source code.

Analysis tools are also adapted to modify the executable code having the annotation. In one aspect, executable code is inserted into the executable code that performs the same function that debugging statements in the source code of the executable perform, thus eliminating the need to modify the source to support analysis. Debug annotations do not require additional code from the debugging or trace statements. Instead, a post-processing analysis tool or debugger, is able to read the annotations and insert the debugging or trace code. Furthermore, the analysis tools can be customized to add or not add each individual annotation or groups of annotations as desired all from a single source executable. In another aspect an optimizer may transform the executable code to run faster or in less memory.

The present invention describes systems, clients, servers, methods, and computer-readable media of varying scope. In addition to the aspects and advantages of the present invention described in this summary, further aspect and advantages of the present invention will become apparent by reference to the drawings and by reading the detailed description that follows.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the present invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into sections. In the first section, the hardware and the operating environment in conjunction with which embodiments of the present invention may be practiced are described. In the second section, a system level overview of the present invention is presented. In the third section, methods for an exemplary embodiment of the present invention are provided. In the fourth section, apparatus implementations of the present invention are described. Finally, in the fifth section, a conclusion of the detailed description is provided.

Hardware and Operating Environment

Figure 1:
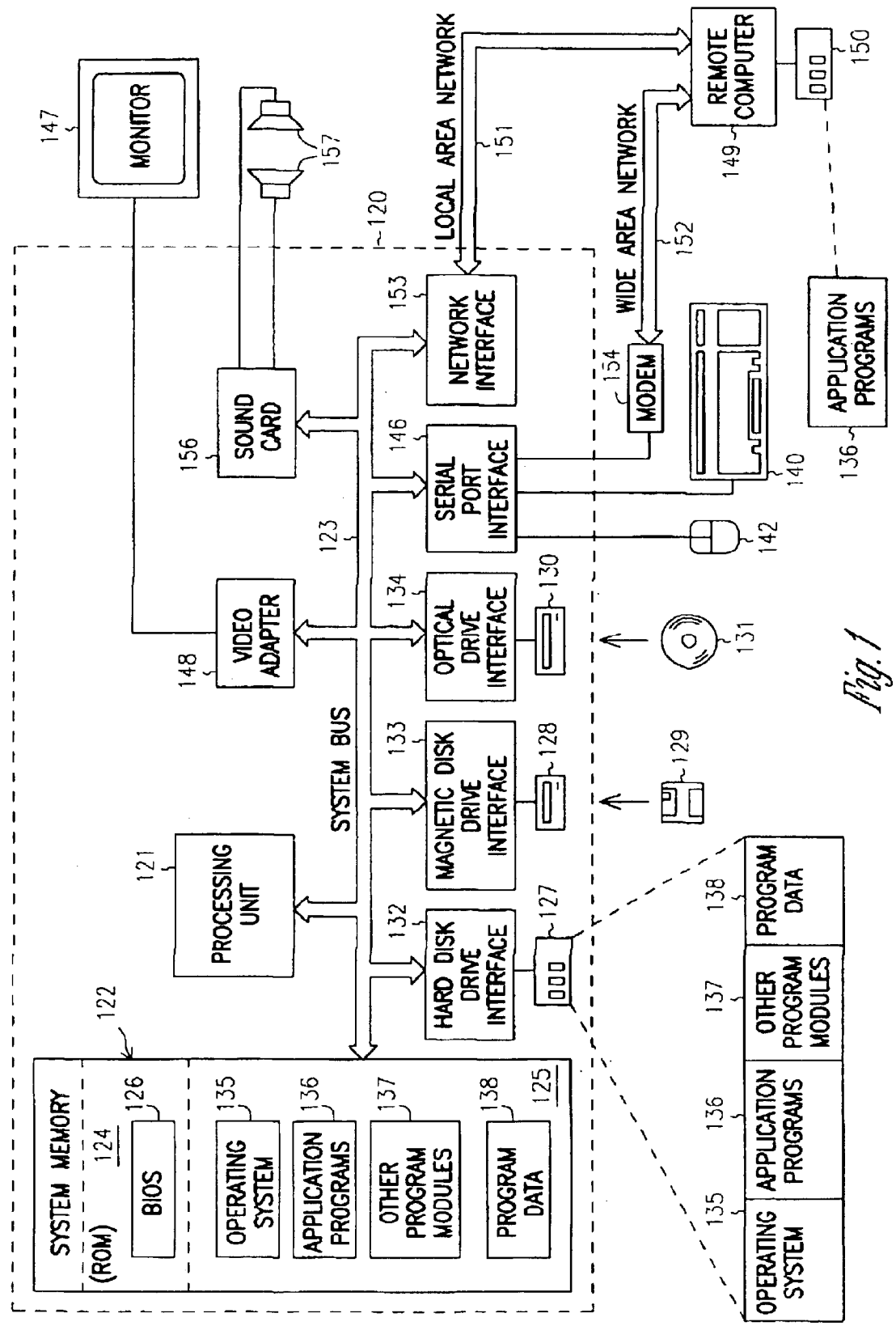
FIG. 1 shows a diagram of the hardware and operating environment in conjunction with which embodiments of the invention may be practiced.

FIG. 1 is a diagram of the hardware and operating environment in conjunction with which embodiments of the present invention may be practiced. The description of FIG. 1 is intended to provide a brief, general description of suitable computer hardware and a suitable computing environment in conjunction with which the present invention may be implemented. Although not required, the present invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the present invention may be practiced with other computer system configurations, including hand-held devices, multi-processor systems, microprocessor-based or programmable consumer electronics, network PCs, minicomputers, mainframe computers, and the like. The present invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the present invention including a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the present invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 34, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output device (not shown), such as speakers and printers.

The computer 20 may operate in a networked environment using logical connections to one or more remote computers, such as remote computer 40. These logical connections are achieved by a communication device coupled to or a part of the computer 20. The present invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, Intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communication device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the present invention may be practiced has been described. The computer in conjunction with which embodiments of the present invention may be practiced may be a conventional computer, a distributed computer, or any other type of computer; the present invention is not so limited. Such a computer typically includes one or more processing units as its processor, and a computer-readable medium such as a memory. The computer may also include a communications device such as a network adapter or a modem, so that it is able to communicatively couple other computers.

System Level Overview

Figure 2:
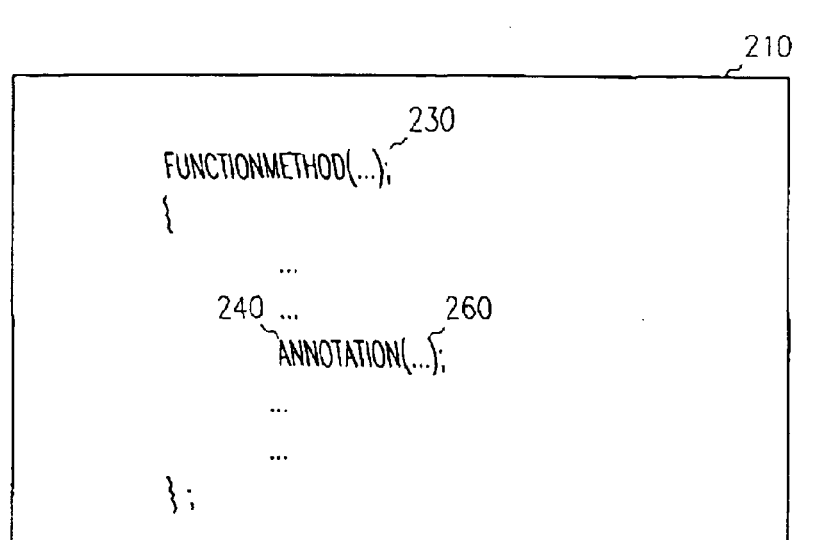
FIG. 2 is a diagram illustrating a system-level overview of an exemplary embodiment of the invention.

A system level overview of the operation of an exemplary embodiment of the present invention is described by reference to FIG. 2.

System 200 includes source code 210 that is compiled or translated into executable computer code 220. Source program 210 includes a function or a method 230, as is well-known by those skilled in the art of computer programming, such as function "functionmethod( . . . );" The function or method 230 contains an intrinsic function 240 that supports non-executable annotation or comment.

When the source code 210 is compiled into the executable computer code 220, the annotation function 240 is translated into non-executable annotation information 250. In one embodiment, the annotation information 250 is generated with information from the parameters 260 of the annotation function 240.

The system level overview of the operation of an exemplary embodiment of the present invention has been described in this section of the detailed description. An annotation function in source code is translated into annotation information. While the present invention is not limited to any particular computer language or compiler, for sake of clarity a simplified example of a computer program has been described.

Methods of an Exemplary Embodiment of the Invention

In the previous section, a system level overview of the operation of an exemplary embodiment of the present invention was described. In this section, the particular methods performed by the server and the clients of such an exemplary embodiment are described by reference to a series of flowcharts. The methods to be performed by the clients constitute computer programs make up of computer-executable instructions. Describing the methods by reference to a flowchart enables one skilled in the art to develop such programs including such instructions to carry out the methods on suitable computerized clients (the processor of the clients executing the instructions from computer-readable media). Similarly, the methods to be performed by the server constitute computer programs also made up of computer-executable instructions. Describing the methods by reference to flowcharts enables one skilled in the art to develop programs including instructions to carry out the methods on a suitable computer (the processor of the computer executing the instructions from computer-readable media).

Figure 3:
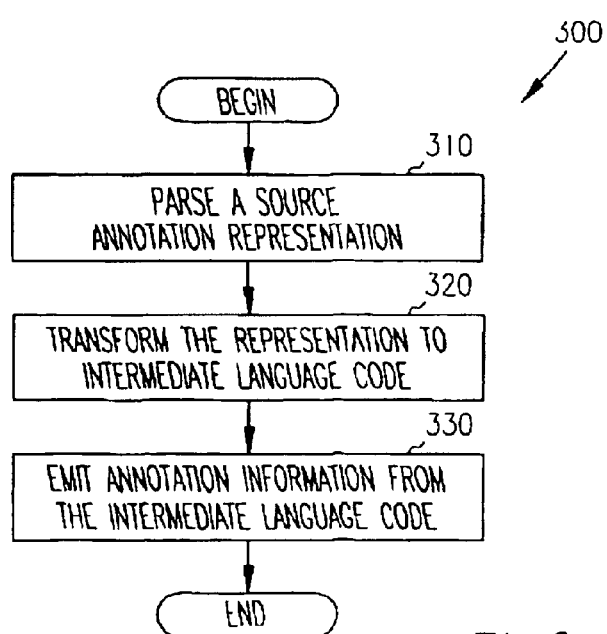
FIG. 3 is a flowchart of a method of annotating an executable computer program according to an embodiment of the invention.

Referring first to FIG. 3, a flowchart of a method 300 of annotating an executable computer program according to an exemplary embodiment of the present invention is shown. This method is inclusive of the acts required to be taken by a compiler. Method 300 generates annotation information from parsed source annotation representation.

More specifically, method 300 includes parsing an intrinsic annotation function call in the source code 310. In one embodiment, the parsing action is performed by the front-end component of a compiler. Thereafter, the annotation function call is transformed into intermediate language code 320. An intermediate language is a computer language used as an intermediate step between the original source language and the target language, such as machine code.

Subsequently, a non-executable statement (e.g. annotation debug information) is emitted or generated from the intermediate language code 330. The annotation debug information corresponds to the annotations function call. In one embodiment, the emitting or generating, 330, is performed by the back-end component of a compiler. More specifically, the intermediate files passed from the compiler front-end to the backend identify the __annotation intrinsic function similar to how other compiler intrinsic functions are identified. However, the identification differs in that string literal arguments to the __annotation intrinsic are not emitted as program data. The string literal arguments are identified so that they are available to the backend but do not appear in the final application outside of the debug information. The same mechanism is used to handle inline assembly using the __asm intrinsic supported for some versions of the frontend and backend. The backend recognizes the —annotation intrinsic and transforms it to a form that behaves similar to a label that might appear in the source. However, a label is different than an __annotation intrinsic in that a label has a name as an identification and an annotation intrinsic has a sequence of strings as an identification. The transformation associates the annotation label with the portion of the program that immediately follows it. As the backend performs optimization and code generation, the annotation stays with the code that the annotation annotates. If the compiler is able to optimize away the annotated code, the annotation is discarded as well. When the code generation is complete the backend will emit the code to an object file and may emit debug information along with it depending on command line options. When debug information is enabled the annotations associated with the generated code are emitted along with other existing debug information. For each instance of an annotation there is no or any number of annotation debug records emitted which contain the location of the annotated code and the string literals from the source code.

Emitting the annotation as a label is advantages because conventional compiler backends support labels, therefore, the present invention is more easily integrated with existing compilers.

In one embodiment of method 300, where the compiler expands a function containing an annotation function inline within another function, the annotation is carried along so that a single annotation in the source will appear everywhere the code it annotates appears. More specifically, the annotation function call is located inline a function (e.g. a second function within the source code) that is called from a plurality of locations within the source code. Emitting of the annotation information includes emitting or generating annotation information from the intermediate language code. The annotation information is associated with a second function. The annotation information corresponds to the annotation function call. A function call that is inlined is a technique whereby the function call is replaced with an instance of the target function's body. The computer program code in the function is replicated at each point where the function is called. More specifically, the actual arguments are substituted for formal parameters. As inline function is usually performed as a compile-time transformation to increase the speed performance of the program. Unrolling a loop is another example where a single instance of an annotation can be expanded into multiple instances. Another example occurs with C++ templates where a single definition of a function can be instantiated multiple times with different template arguments.

In another embodiment of method 300, the method includes constructing or generating at least one string parameter of the annotation function call according to a software component selected from the group consisting of a macro and a command line definition.

In yet another embodiment of method 300, the content of parameters is designed with a convention that corresponds, relates, or identifies different areas of interest in analysis of the program.

In still another embodiment, method 300 also includes emitting or generating an annotation symbol, (e.g. S_ANNOTATION) to the symbol table of the program, which in varying embodiments is performed before, during or after emitting the annotation information, 330. In one embodiment of the annotation symbol, the annotation symbol contains an address, and the annotation symbol contains string parameters of the annotation function call.

In yet another embodiment of method 300, the method includes receiving an input parameter, and controlling the generating of the annotation information in accordance with the input parameter. In one embodiment of an input parameter, a define parameter (e.g. #DEFINE in the source code, or a "/D" parameter on the command line that invokes the compiler) is implemented, in which the define parameter indicates that a flag specified by an operand of the define is operable, and the compiler will generate annotation information in accordance with the predefined meaning of the define operand.

In still yet another embodiment of method 300, the method includes emitting or generating debug information from predetermined information, such as compiler command line options. The debug information is associated with the annotation function call.

Figure 4:
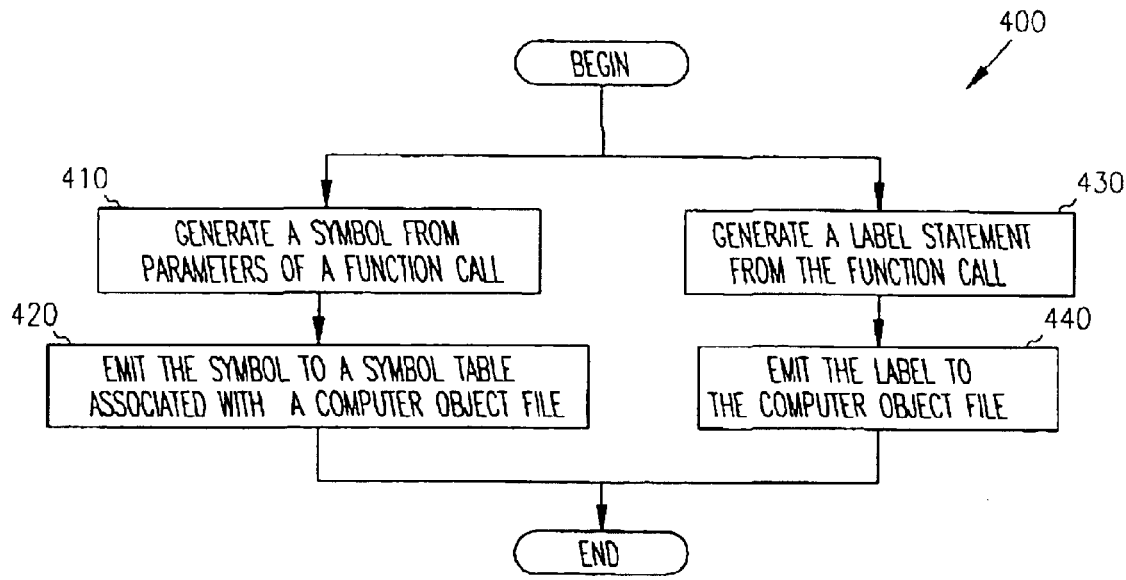
FIG. 4 is a flowchart of a method of annotating computer source code using an intrinsic function call in the source code, according to an embodiment of the invention.

Referring next to FIG. 4, a flowchart of a method 400 of annotating computer source code using an intrinsic function call in the source code, according to an exemplary embodiment of the present invention is shown. This method is inclusive of the acts required to be taken by a compiler.

Method 400 includes generating a symbol from the parameter of an intrinsic function call 410. In one embodiment, action 410 includes generating a symbol from string parameters of the intrinsic function call. Subsequent to action 410, the method includes emitting the symbol to a symbol table associated with a computer object file 420. The symbol table in varying embodiments is an object file symbol table and/or the debug symbol table.

Method 400 also includes generating annotation information from the intrinsic function call 430. The intrinsic function call has parameters, such as string parameters. Subsequent to action 430, method 400 includes emitting the annotation information into the computer object file 440. More specifically, emitting the annotation information into the computer object file 440 in varying embodiments includes emitting the annotation information to a debug record and/or emitting the annotation information to a object file symbol table entry to support a means of expressing a pointer to a location. In varying embodiments, action 430 and 440 are performed before, during, or after action 410 and 420.

Figure 5:
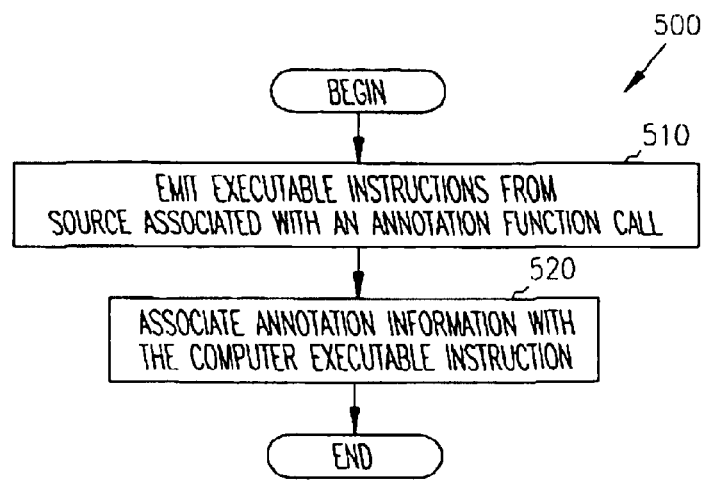
FIG. 5 is a flowchart of a method of annotating an executable computer program, supplemental to FIG. 3 and FIG. 4, according to an embodiment of the invention.

Referring next to FIG. 5, a flowchart of a method 500 of further actions of annotating an executable computer program, as in method 300 and method 400, according to an exemplary embodiment of the present invention is shown. This method is inclusive of the acts required to be taken by a compiler.

Method 500 is performed after the annotation function call is transformed into intermediate language code 320 in FIG. 300, and in varying embodiments, before, during or after any of the actions of method 400.

The method 500 includes emitting or generating computer executable instructions from course code that is associated with the annotation function call 510. This source code that is associated with the annotated function is the source code that immediately succeeds the annotation function call.

Method 500 further includes associating annotation debug information with the computer executable instruction(s) that is/are associated with the annotation function call 520. The computer executable instructions are generated in action 510. The annotation debug information is generated in action 330 in FIG. 3 and action 410 in FIG. 4.

The particular methods performed by a compiler of an exemplary embodiment of the present invention have been described in FIG. 3, FIG. 4, and FIG. 5.

Figure 6:
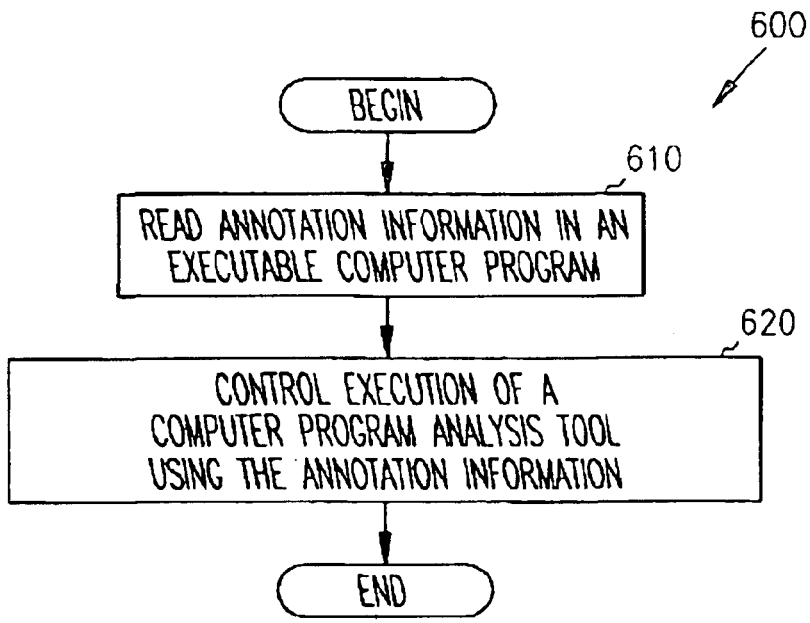
FIG. 6 is a flowchart of a method of controlling a computer program analysis tool, according to an embodiment of the invention.

Referring next to FIG. 6, a flowchart of a method 600 of controlling a computer program analysis tool, according to an exemplary embodiment of the present invention is shown. This method is inclusive of the acts required to be taken by a computer program analysis tool.

Method 600 includes receiving or reading annotation debug information in an executable computer program 610. In one embodiment, the annotation debug information having been generated from an intrinsic annotation function call in the source code that the executable computer program was compiled from, such as disclosed in method 300, 400 and 500. In another embodiment, the annotation debug information includes string parameters. The method thereafter includes controlling execution of the computer program analysis tool using the annotation debug information 620. In another information, the execution of the computer program analysis tool is controlled using the string parameters from the annotation debug information. In yet another embodiment, an output of the computer program analysis tool is ready as input to a second computer program analysis tool and the second computer program analysis tool is a profiler, a fault injector, or an optimizer.

This method eliminates the need of compiling a special version of the executable program for purposes of analysis because an analysis tool is able to use the annotation information that existed in the source before compilation of the source.

Figure 7:
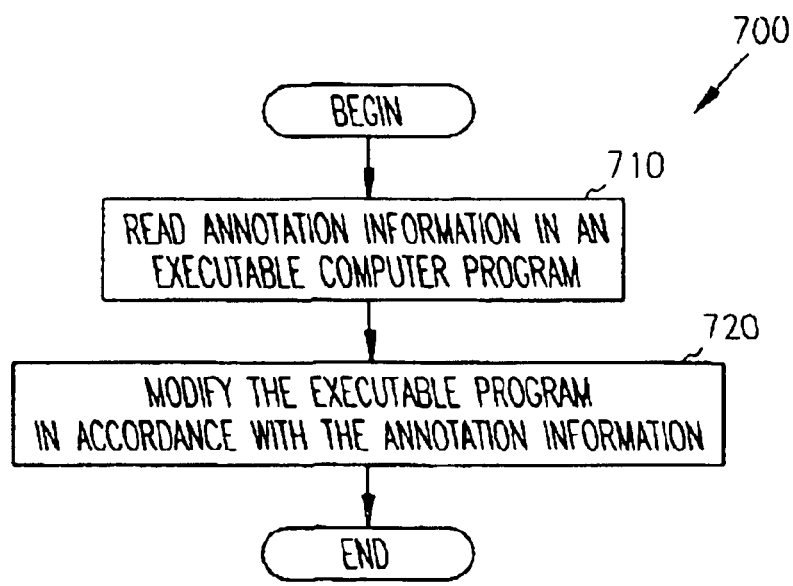
FIG. 7 is a flowchart of a method of modifying an executable computer program, according to an embodiment of the invention.

Referring next to FIG. 7, a flowchart of a method 700 of modifying an executable computer program, according to an embodiment of the present invention is shown.

Method 700 includes receiving or reading an annotation debug information in an executable computer program 710. In one embodiment, the annotation debug information was generated from an annotation function call in the source code that the executable computer program was compiled from. In another embodiment, the annotation debug information includes information.

Subsequently, method 700 includes modifying the executable program in accordance with the annotation debug information 720. In another embodiment, method 700 includes modifying the executable program to perform an action in accordance with the information in the annotation debug information.

In one embodiment of modifying the executable program 720, the modifying includes inserting code into the executable program to perform an action in accordance with the information in the annotation debug information. In one embodiment of inserting code, the inserted code includes executable instructions.

This method enables the annotation function to be used as a mark in the source code for later use by analysis tools.

This method also eliminates the need of compiling a special version of the executable program for purposes of testing and analysis because an analysis tool is able to use the annotation information that existed in the source before compilation of the source, and that is carried through to the annotation debug information in the executable program. Many profiling tools include an API to enable the programmer to start and stop profiling while the program executes. One common use of this was to enable profiling just before the code responsible for some task and to turn it off afterwards. This is handled by inserting calls to the function StartProfile and StopProfile. When the application is built the StartProfile and StopProfile references are emitted as real code that calls a profiler specific DLL. The result is a profiler-specific build. RationalΘ PurifyΘ and CompuwareΘ BoundsCheckerΘ are examples of tools that have APIs that work similarly except that the implementation of the API functions included in the general executable are stub or dummy functions that perform no actions. Only when running do these tools replace the dummy API implementations with the actual implementations. Using annotations there need be no special build nor overhead in the regular build since the location of the points of interest can be found from the debug information alone.

Another advantage of annotations is that a single version of an executable program can be having multiple sets of annotations for different profiles of interest.

The particular methods performed by an analysis tool of an exemplary embodiment of the present invention have been described in FIG. 6 and FIG. 7.

Implementation

In this section of the detailed description, particular implementations of a compiler and an analysis tool of the present invention are described.

Figure 8:
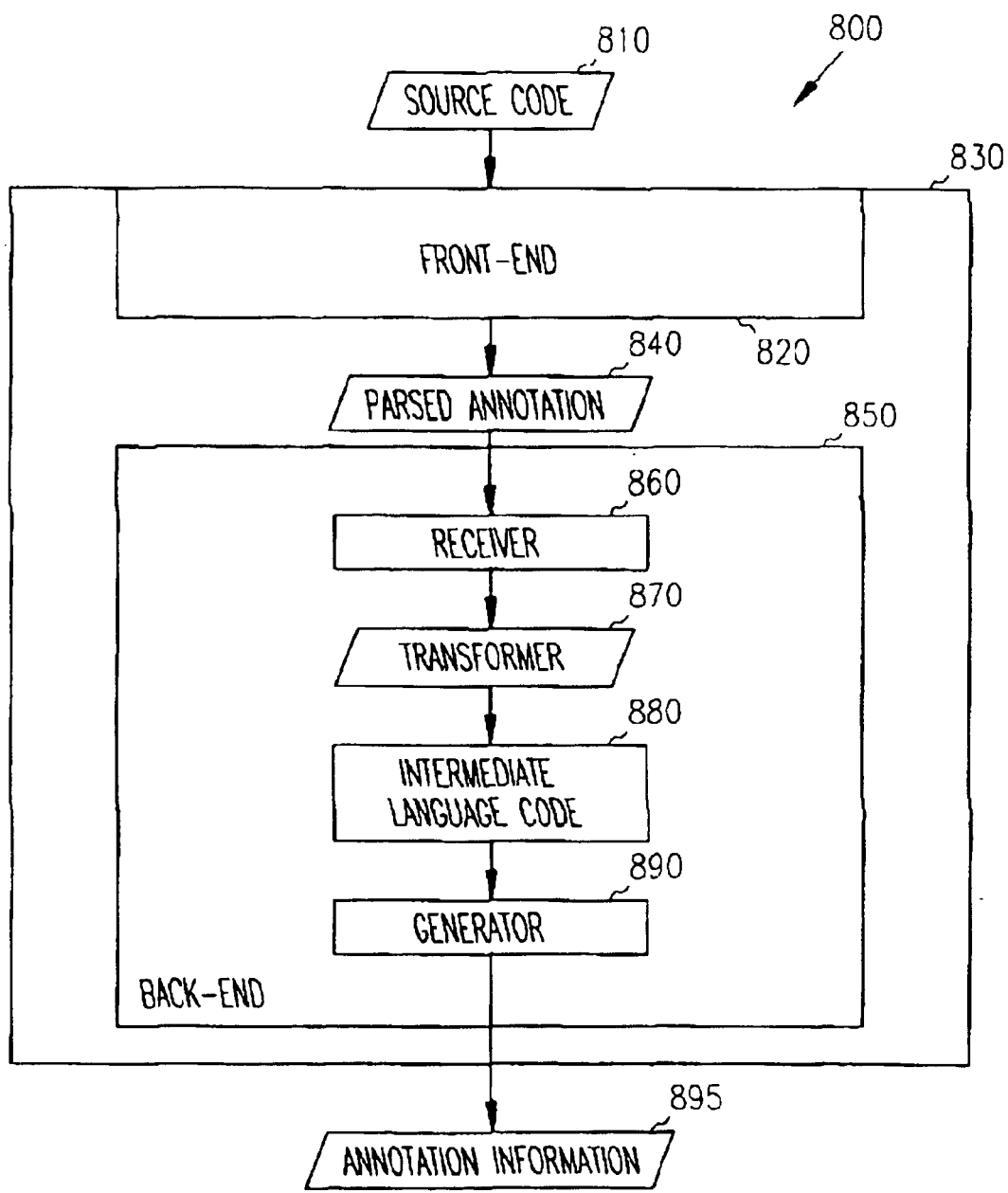
FIG. 8 is a block diagram of an apparatus for generating annotation information from an annotation function according to an exemplary embodiment of the invention.

FIG. 8 is a block diagram of an apparatus 800 for generating annotation information from an annotation function according to an exemplary embodiment of the invention. Apparatus 800 includes a compiler 830 that has a front-end component 820 that parses a received annotation function call from source code 810, thereby generating a parsed annotation 840. The compiler 830 also has a back-end component 850 that is operably coupled to the front-end component 820. The back-end component 850 generates annotation information 895 from the annotation function call.

The back-end component 850 has a receiver 860 operably coupled to the front-end component 820, that receives the parsed annotation function 840. The back-end component 850 also has a transformer 870 that is operably coupled to the receiver 860, that transforms the parsed annotation function 840 into intermediate language code 880. The back-end component 850 also includes a generator 890 that is operably coupled to the transformer 870. The generator outputs annotation information 895 from the intermediate language code 880.

In one embodiment, compiler 830 also includes a receiver (not shown) of an input parameter, and a controller (not shown) that controls the generator of the annotation information in accordance with the input parameter. One example of a controller is a compiler back-end.

Figure 9:
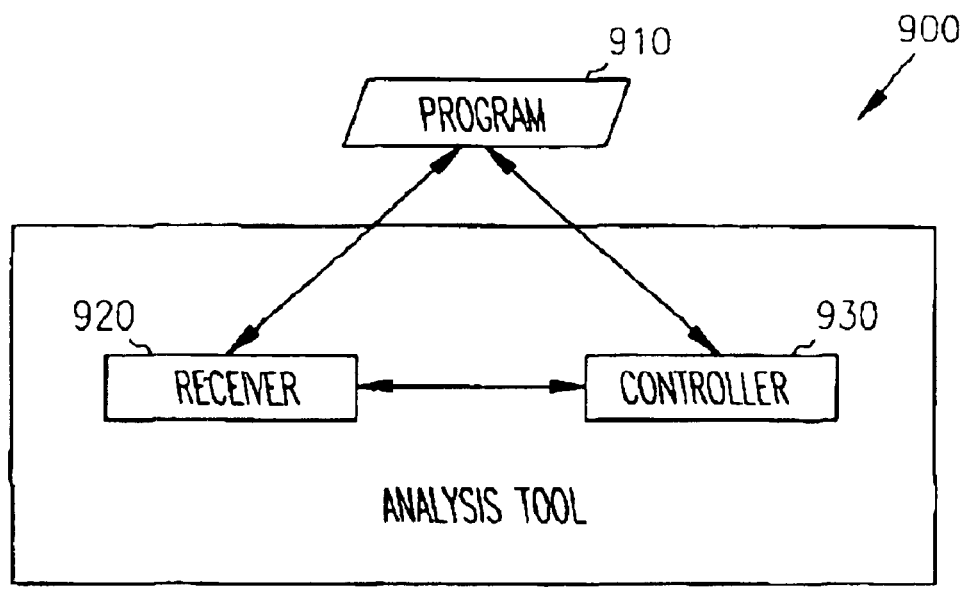
FIG. 9 is a block diagram of an apparatus for controlling the execution of a computer program using annotation information in the computer program according to an exemplary embodiment of the invention.

FIG. 9 is a block diagram of an apparatus 900 for controlling the execution of a computer program using annotation information in the computer program according to an exemplary embodiment of the invention.

The apparatus 900 includes a receiver or reader 920 of annotation information in an executable computer program 910 during execution of the executable computer program. The annotation information having been generated from an intrinsic annotation function that the executable computer program was compiled from, as in methods 300, 400, 500, 600, and 700. The annotation information includes information, such as a symbolic address and one or more operands (not shown).

The analysis tool apparatus 900 includes an execution controller 930 that controls the execution of the computer program analysis tool using the annotation information. In one embodiment, the annotation information overrides the default behavior of the tool. The execution controller 930 is operably coupled to the receiver 920. In another embodiment, the computer program analysis tool is a computer program analysis tool.

Figure 10:
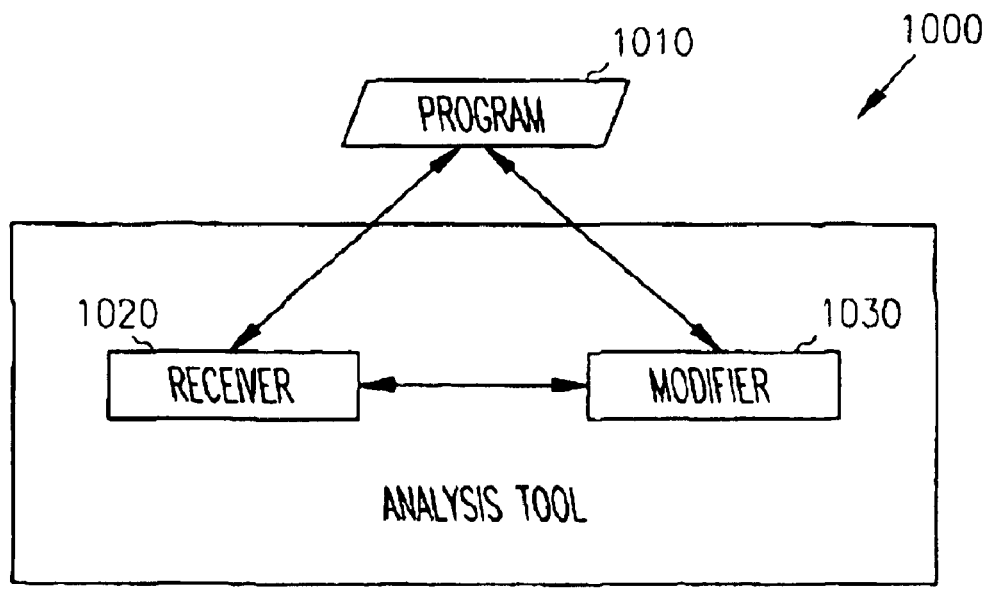
FIG. 10 is a block diagram of an apparatus for modifying an executable program using annotation information in the computer program according to an exemplary embodiment of the invention.

FIG. 10 is a block diagram of an apparatus 1000 for modifying an executable program using annotation information in the computer program according to an exemplary embodiment of the invention. Another analysis tool apparatus 1000 includes a receiver or reader 1200 of annotation information in an executable computer program 1010. The annotation information having been generated from an intrinsic annotation function that the executable computer program was compiled from, as in methods 300, 400, 500, 600, and 700. The annotation information includes information, such as a symbolic address and one or more operands (not shown).

The tool 1000 also includes a modifier 1030 of the executable program that modifies the executable program 1010 in accordance with the information in the annotation information. In one embodiment of the modifier 1030, the modifier 1030 includes an inserter of executable computer code into the executable program 1010 to perform an action in accordance with the information in the annotation information. In another embodiment, the computer program analysis tool is a computer program analysis tool.

More specifically, in computer-readable program embodiments of apparatus 800, 900, and 1000, the programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (A.P.I.) or interprocess communication techniques such as remote procedure call (R.P.C.), common object request broker architecture (CORBA), Component Object Model (COM), Distributed Component Object Model (DCOM), Distributed System Object Model (DSOM) and Remote Method Invocation (RMI). The components execute on as few as one computer as in computer 110 in FIG. 1, or on at least as many computers as there are components.

Conclusion

A compiler that translates a source annotation representation call into annotation information and analysis tools that support non-executable statements has been described. Although specific embodiments has been illustrated and described herein, it will be appreciated by those of ordinary skill in the art that any arrangement which is calculated to achieve the same purpose may be substituted for the specific embodiment shown. This application is intended to cover any adaptations or variations of the present invention.

For example, those of ordinary skill within the art will appreciate that the term function also includes object-oriented methods. Those of ordinary skill in the art will appreciate that labels are one embodiment of annotation information.

A source annotation representation is supported by computer language translators, such as compilers and/or linkers, to annotate program code, so that analysis tools, such as debuggers and profilers, have more information with which to analyze the executable program. The source annotation representation in the source code is compiled into annotation information. The annotation information is the executable program is associated with the code that the annotation function is associated with. The present invention eliminates the need of parallel/companion input command files, eliminates the need of compiling a special version of the executable program for purposes of analysis, and eliminates the need of implementing debug statements in the source code.

The terminology used in this application with respect to analysis tools is meant to include all of these environments. Therefore, it is manifestly intended that this invention be limited only by the following claims and equivalents thereof.

I claim:

1. A computerized method of annotating a computer program comprising:
   parsing source code and an annotation representation associated with the computer program, wherein the annotation representation annotates a portion of the source code;
   transforming the parsed annotation representation into intermediate language code;
   generating annotation information from the intermediate language code, wherein the annotation information corresponds to the parsed portion of the source code that the annotation representation annotates, and
   analyzing the computer program with the annotation information.

2. The computerized method as in claim 1,
   wherein the annotation information contains an address; and
   wherein the annotation information contains a plurality of arguments of the annotation representation.

3. The computerized method as in claim 2, wherein annotation information further comprises an annotation symbol.

4. The computerized method as in claim 2, wherein a convention in the arguments identifies different areas of interest.

5. The computerized method as in claim 2, further comprising:
   generating at least one argument of the annotation representation according to a software component.

6. The computerized method as in claim 5, wherein the software component is selected from the group consisting of a macro and a command line definition.

7. The computerized method as in claim 1, further comprising:
   receiving an input argument; and
   controlling the generating of the annotation information in accordance with the input argument.

8. The computerized method as in claim 1, wherein:
   the parsing is performed by the front-end component of a compiler; and
   the generating is performed by the back-end component of the compiler.

9. The computerized method as in claim 1, further comprising:
   generating computer executable instructions from the portion of the source code that the annotation representation annotates; and
   associating the annotation information with the computer executable instructions.

10. The computerized method as in claim 1, wherein the annotation representation is located inline within a function.

11. The computerized method as in claim 1, further comprising generating debug information from predetermined information, wherein the debug information is associated with the annotation representation.

12. The computerized method as in claim 11, wherein the predetermined information further comprises command line options.

13. The computerized method as in claim 1, wherein the annotating representation comprises a function call, and wherein the annotation information comprises parameters.

14. The computerized method as in claim 13, wherein the function call includes at least one argument.

15. The computerized method as in claim 14, wherein the at least one argument corresponds to a parameter.

16. A computerized method for annotating computer source code, comprising:
   generating annotation information from an intrinsic function call in the source code, wherein the annotation information annotates at least one parameter associated with the intrinsic function call;
   generating a symbol from the at least one parameter;
   emitting the annotation information into a computer object file; and
   emitting the symbol to a symbol table associated with the computer object file, wherein the annotation information corresponds to the at least one parameter by the association between the symbol table and the computer object file.

17. The computerized method as in claim 16, wherein generating annotation information and emitting the annotation information are performed in parallel with generating a symbol and emitting the symbol.

18. The computerized method as in claim 16, further comprising:
   generating computer executable instructions from the source code that is associated with the intrinsic function call; and
   associating the annotation information with the computer executable instructions.

19. The computerized method as in claim 16, wherein a convention in the at least one parameter identifies different areas of interest in analysis.

20. A computerized method of controlling a first computer program analysis tool, comprising:
   generating annotation information that annotates a portion of source code associated with an executable computer program;

compiling the executable computer program, wherein the annotation information corresponds to the portions of the executable computer program that are associated with the portion of the source code that the annotation information annotates;

reading the annotation information from the executable computer program; and controlling execution of the first computer program analysis tool using the annotation information.

21. The computerized method as in claim 20, wherein the first computer program analysis tool further comprises a program analysis tool selected from the group consisting of a debugger, profiler, a fault injector, and an optimizer.

22. The computerized method as in claim 20, wherein an output of the first computer program analysis tool is read as input to a second computer program analysis tool.

23. The computerized method as in claim 22, wherein the second computer program analysis tool further comprises a program analysis tool selected from the group consisting of a profiler, a fault injector, and an optimizer.

24. A computerized method of modifying an executable computer program, comprising:

generating annotation information that annotates a portion of source code associated with the executable computer program;

compiling the executable computer program, wherein the annotation information corresponds to the portions of the executable computer program that are associated with the portion of the source code that the annotation information annotates;

reading the annotation information in the executable computer program; and modifying the executable computer program in accordance with the annotation information.

25. The computerized method as in claim 24, wherein the modifying further comprises inserting code into the executable computer program to perform an action in accordance with the annotation information.

26. The computerized method as in claim 24, wherein the modifying further comprises optimizing the executable computer program in accordance with the annotation information.

27. The computerized method as in claim 24, wherein the annotation information comprises at least one string parameter.

28. A computer-readable medium having computer-executable instructions to a cause a computer to perform a method comprising:

parsing an intrinsic annotation function call within source code associated with a computer program thereby generating a parsed annotation function, wherein the parsed annotation function annotates a portion of the intrinsic annotation function call;

generating annotation information from the parsed annotation function; and analyzing the computer program with the annotation information, wherein the annotation information corresponds to the portion of the intrinsic function that the parsed annotation function annotates.

29. A computer-readable medium as in claim 28, having computer-executable instructions to a cause a computer to perform a method further comprising:

generating a symbol from string parameters of the intrinsic function call; and emitting the symbol to a symbol table associated with the annotation information.

30. A computer-readable medium as in claim 28, wherein the annotation information resides in an object file that is stored on a computer-readable medium.

31. A computer-readable medium as in claim 28, wherein the intrinsic annotation function call is generated by a software component that resides on a computer readable medium.

32. A computer-readable medium as in claim 31, wherein the intrinsic annotation function call is selected from the group consisting of a macro and a command line definition.

33. A computer-readable medium having computer-executable instructions to cause a computer to perform a method for controlling a computer program analysis tool, comprising:

generating annotation information that annotates a portion of source code associated with an executable computer program;

compiling the executable computer program, wherein the annotation information corresponds to the portions of the executable computer program that are associated with the portion of the source code that the annotation information annotates;

reading the annotation information in the executable computer program; and controlling execution of the computer program analysis tool using the annotation information.

34. The computer-readable medium as in claim 33, wherein the compiling further comprises compiling the executable computer program from an intrinsic annotation function call within the source code, wherein the annotation information includes at least one string parameter and the intrinsic annotation function call.

35. A computer-readable medium having computer-executable instructions to a cause a computer to perform a method for modifying an executable computer program, comprising:

generating annotation information that annotates a portion of source code associated with the executable computer program;

compiling the executable computer program, wherein the annotation information corresponds to the portions of the executable computer program that are associated with the portion of the source code that the annotation information annotates;

reading the annotation information in the executable computer program; and modifying the executable computer program in accordance with the annotation information.

36. The computer-readable medium as in claim 35, wherein the compiling further comprises compiling the executable computer program from an intrinsic annotation function call within the source code, wherein the annotation information includes at least one string parameter and the intrinsic annotation function call.

37. The computer-readable medium as in claim 35, wherein the modifying further comprises inserting code into the executable program to perform an action in accordance with the annotation information.

38. A computer-readable medium having computer-executable instructions to a cause a computer to perform a method for annotating a computer program, comprising:

parsing a source annotation representation in an executable computer program, yielding a parsed source annotation representation, wherein the parsed source annotation representation annotates a portion of the executable computer program;

generating annotation information from the parsed source annotation representation; and analyzing the executable computer program with the annotation information, wherein the annotation information corresponds to the portion of the executable computer program that the parsed source annotation representation annotates.

39. A computer-readable medium having stored thereon a data structure that is executable by a processor, the data structure comprising:

annotation information corresponding to an annotation function in a source computer program, wherein the annotation information continues to correspond to the annotation function after the source computer program is compiled.

40. The computer-readable medium as in claim 39, wherein the annotation information further comprises an operand corresponding to parameters of the annotation function in the source computer program.

41. A computer-readable medium having stored thereon a compiler comprising:

a front-end component that is arranged to parse an annotation function call in source code associated with a computer program, thereby generating a parsed annotation function, wherein the parsed annotation function annotates a portion of the source code; and a back-end component operably coupled to the front-end component, comprising:

a receiver operably coupled to the front-end component, wherein the receiver is arranged to receive the parsed annotation function, a transformer operably coupled to the receiver, wherein the transformer is arranged to transform the parsed annotation function into intermediate language code, a generator operably coupled to the transformer, wherein the generator is arranged to generate annotation information from the intermediate language code, and an analyzer operably coupled to the generator, wherein the analyzer is arranged to analyze the computer program with the annotation information, wherein the annotation information corresponds to the portion of the source code that the parsed annotation function annotates.

42. A computer-readable medium having stored thereon a computer program analysis tool apparatus comprising:

a receiver of annotation information from an executable computer program, wherein the annotation information annotates a portion of source code associated with the executable computer program; and an execution controller operably connected to the receiver, wherein the execution controller is arranged to control the execution of the computer program analysis tool using the annotation information such that the annotation information corresponds to the portions of the executable computer program that are associated with the portion of the source code that the annotation information annotates.

43. The computer-readable medium, as in claim 42, wherein the execution controller overrides the default behavior of the computer program analysis tool using the annotation information.

44. The computer-readable medium, as in claim 43, wherein output of the computer program analysis tool is read as input to another computer program analysis tool.

45. A computer-readable medium having stored thereon a computer program analysis tool apparatus comprising:

a receiver of annotation information from an executable computer program, wherein the annotation information annotates a portion of source code associated with the executable computer program; and a modifier of the executable computer program operably connected to the receiver, wherein the modifier is arranged to modify the executable computer program in accordance with the annotation information such that the annotation information corresponds to the portions of the executable computer program that are associated with the portion of the source code that the annotation information annotates.

46. The computer-readable medium as in claim 45, wherein the modifier further comprises an inserter of executable computer code into the executable program to perform an action in accordance with the information in the annotation information.

47. The computer-readable medium, as in claim 45, wherein output of the computer program analysis tool is read as input to another computer program analysis tool.

\* \* \* \* \*